Jan. 6, 1970    F. PERNACK ET AL    3,487,516
GEAR SHAVING CUTTER
Filed Jan. 9, 1967
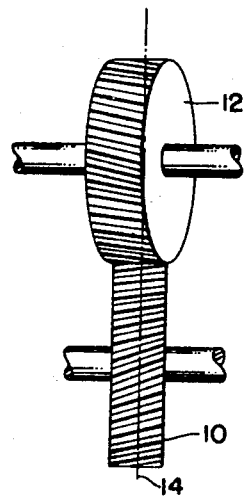
FIG.1
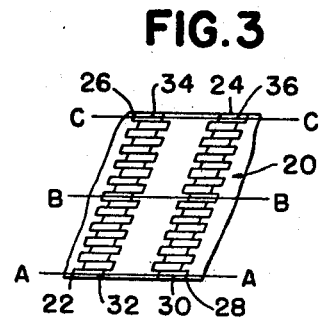
FIG.3
FIG.2
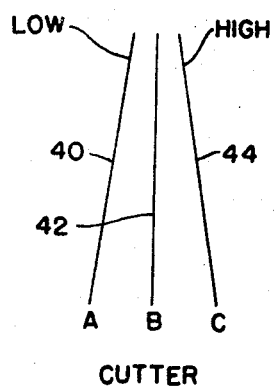
CUTTER
FIG.4
GEAR
FIG.5
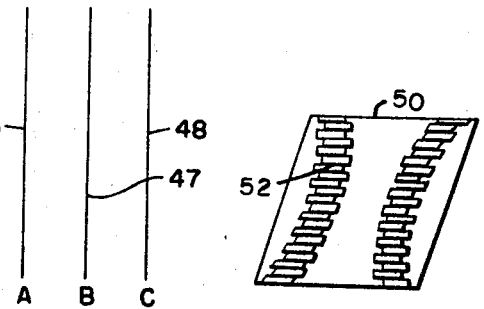
FIG.6
INVENTORS
FRANK PERNACK
EDWARD Z. KRYGIER
BY
ATTORNEYS United States Patent Office 3,487,516
Patented Jan. 6, 1970

3,487,516
GEAR SHAVING CUTTER
Frank Pernack, Birmingham, and Edward Z. Krygier, Royal Oak, Mich., assignors, by mesne assignments, to Lear Siegler, Inc., Santa Monica, Calif., a corporation of Delaware
Filed Jan. 9, 1967, Ser. No. 608,045
Int. Cl. B26d 1/12
U.S. Cl. 29—103    6 Claims

ABSTRACT OF THE DISCLOSURE

A gear shaving cutter for shaving work gears to have desired involutes at both ends and centrally of the teeth, at both sides thereof, the cutter having a tooth form conjugate to the desired involute midway between its ends, a tooth form having plus and minus involute modifications at its acute and obtuse ends respectively.

BACKGROUND OF THE INVENTION

The invention relates to gear shaving in which a work gear is rotated in tight mesh with a tool in the form of a steel gear having grooves or serrations provided in the sides of its teeth to form cutting edges therein. Ordinarily, the cutter is driven in rotation and the gear, being freely rotatable, is rotated by the cutter. The helix angle of the cutter is selected with reference to the helix angle of the gear such that the gear and cutter mesh with their axes crossed at a limited angle, as for example between 3 and 30 degrees. Due to this crossed axes relationship the tooth surfaces of the cutter tend to have point contact with the teeth of the gear. This of course is not the actual condition which exists, due to deformation and due also to the presence of the grooves or serrations and cutting edges in the teeth of the cutter. However, there is a tendency for the cutter to concentrate its action at an intermediate point between the ends of the gear teeth, adjacent the zone determined by the common normal to the axes of the gear and tool. The degree to which this condition exists is of course dependent upon the crossed axes angle.

Originally, in order to distribute the cutting action of the shaving cutter uniformly from end to end of the gear teeth, the gear during its rotation was reciprocated axially for a distance at least approximately equal to its width, and in addition, the direction of rotation of the gear and cutter was reversed.

Subsequently, it was found that improved results were obtained when the direction of traverse of the gear relative to the cutter was in a direction oblique to the axis of the gear, and again, the amount of traverse was such as to cause the gear to move relative to the center of crossed axes or the common normal to the axes of the gear and cutter so as to distribute the cutting action from end to end of the gear teeth.

More recently, it has been found that still further improvement may be obtained when the shaving operation is carried out by a relative depth feed referred to as a plunge feed between the gear and cutter, in the absence of any traverse parallel to or diagonal to the axis of the gear. In some cases this requires a modification of the tooth form of the cutter, this modification being a longitudinal concavity which causes the tooth to envelop or partly envelop mating teeth of the gear.

In the past it has been usual to specify a desired involute or modification of a theoretically perfect involute, and it has also been conventional to modify the teeth of the gear to produce longitudinal convexity by operations which are referred to in the art as crowning.

SUMMARY OF THE INVENTION

It has recently become a requirement in the gear finishing art to provide gear teeth the involute profiles of which are according to specification both centrally and adjacent opposite ends thereof. It has been found that when gears are finished by the now conventional gear shaving operations, using standard gear shaving cutters having teeth of identical profile from end to end, a gear tooth whose involute profile midway between the ends of the teeth is in accordance with the desired involute modifications, will show a departure from the desired involute adjacent the ends of its teeth. This departure is in the nature of a plus involute adjacent the acute angle corners and a minus involute adjacent the obtuse angle corners on helical gears.

It is an object of the present invention to provide a gear shaving cutter having its teeth modified in such a way as to produce identical involute surfaces throughout the entire length from end to end at both sides of the teeth of work gears.

More specifically, it is an object of the present invention to provide involute modification on a cutter in the form of a plus involute profile on the tooth surfaces which contact the tooth surfaces of helical gears adjacent the obtuse corners thereof.

Other objects and features of the invention will become apparent as the description proceeds, especially when taken in conjunction with the accompanying drawings, illustrating a preferred embodiment of the invention.

BRIEF DESCRIPTION OF THE DRAWING

FIGURE 1 is an elevational view of a gear and cutter in operating relationship.

FIGURE 2 is an end view of a single tooth of a cutter.

FIGURE 3 is a plan view of the tooth shown in FIGURE 2.

FIGURE 4 is a showing of a plotting or involutes on a cutter.

FIGURE 5 is a similar plotting of the involutes on a work gear produced by the cutter charted in FIGURE 4.

FIGURE 6 is a plan view of a tooth having concave opposite side surfaces.

DESCRIPTION OF THE PREFERRED EMBODIMENTS

Referring now to FIGURE 1, the gear shaving operation comprises rotating the gear 10 in tight mesh with a cutter 12, the teeth of the cutter having a helix angle different from the helix angle of the teeth of the gear such as to require the axes of the gear and cutter to be crossed as indicated in FIGURE 1. In this figure it will be noted that the axis of the gear 10 is parallel to the plane of the figure whereas the axis of the cutter 12 occupies a horizontal plane but extends obliquely with respect to the axis of the gear 10. A line, indicated by the dot and dash line 14, is drawn perpendicular to and intersecting the axes of both the gear and cutter and is referred to herein as the common normal to the axes. Where this line intersects the zone of mesh between the teeth of the gear and cutter the cutting action of the cutter is at a maximum and this zone is referred to as the center of crossed axes.

The operation suggested in FIGURE 1 has in the past been carried out by reciprocating the gear in a direction parallel to its axis back and forth while reversing the direction of rotation to insure equal cutting on both sides of the teeth of the gear. In most cases a relative radial feed between the gear and cutter was provided at the end of all or some of the traverse strokes.

Subsequently, a similar operation was carried out except that the direction of reciprocation between the gear and tool was accomplished by reciprocating the gear in a horizontal plane beneath the cutter but in a direction oblique both to the axis of the gear and the cutter, as for example at an angle of 45 degrees to the plane of the figure.

Still later, improved results have been found when the relative traverse between the gear and cutter in the plane which is horizontal in FIGURE 1, is eliminated. Stock removal is provided by vertical feed between the gear and cutter, as for example, upward feed of the gear 10 followed by a brief dwell at depth, which in turn is followed by rapid withdrawal.

Finally, another operation has been introduced to produce crowning or longitudinally convex teeth on the work gear. This conventionally is a rocking movement of the gear 10 about an axis below and perpendicular to its own axis in timed relation to traverse.

When the gear 10 is a helical gear so that diagonally opposite corners of each tooth are either obtuse or acute, it has been found that the result of shaving with diagonal traverse, or in plunge shaving, or in shaving with axial traverse combined with the crowning action by rocking, involute errors are introduced into the work gear. These errors are not of great magnitude but are capable of being determined by accurate gear checking instruments, and particularly involute checkers now available. These errors in many cases are of no significance in operation, particularly where the teeth of the gear are crowned, but nevertheless in high precision gearing there is in some cases a requirement that the involutes as measured adjacent the ends of the teeth of the work gear shall be within small limits identical with the involutes at the center of the teeth.

The pattern of involute error introduced by conventional shaving as it has heretofore been known and also by the newly introduced art of plunge shaving, is that the involutes as measured adjacent the ends of the gear teeth and adjacent the acute angle corners thereof are plus with respect to the desirable involute and are minus adjacent the obtuse ends.

Reference is made hereto to desired involutes. It should be understood that in modern gear design it is of course possible to produce theoretically perfect involutes. However, in many cases gear designers prefer to have some modification as for example, a minus involute adjacent the top of the tooth. This involute modification may be specified and provided by suitable modification of the shaving cutter.

It has been found that in order to produce identical involutes at both ends and the center and at both sides of the teeth of helical gears, the gear shaving cutter must be modified so that its teeth, instead of being of identical involute from end to end, shall have a plus involute adjacent the acute corners and a minus involute adjacent the obtuse corners.

Referring now to FIGURES 2 and 3, a cutter tooth 20 is indicated having acute corners 22 and 24, and obtuse corners 26 and 28. In order to produce identical involutes both midway between the ends of the teeth and adjacent the ends of the teeth of helical work gears, the involute profile of the teeth 20 of the cutter are modified so that when an involute check is made in plane A—A the involute at the obtuse corner measured along the line 30 is a low or minus involute, and the involute along the line 32 adjacent the acute corner is a high or plus involute, both with respect to the involute which would be conjugate to the desired involute on the teeth of the gear. The involute of the cutter tooth measured along the plane B—B at both sides of the tooth will be conjugate to the desired involute on the teeth of the gear. The profile of the teeth as measured in the plane C—C is modified so that the involute 34 adjacent the obtuse corner of the tooth is a high or plus involute with respect to the involute which would be conjugate to the desired involute on the teeth of the gear. Similarly, the involute at 36 adjacent the acute corner 24 of the cutter tooth is a high or plus involute compared to the involute which would be conjugate to the desired involute on teeth of the gear.

The profile modifications at 32 and 36 are identical as are the profile modifications at 30 and 34.

Reference has been made to a high or plus modification and a low or minus modification, and this is best illustrated in FIGURE 4. In this figure there is illustrated the charted results of an involute check as measured by accurate involute checkers now available on the market. These checkers operate to move a finger from root to crest of a gear tooth in a plane of rotation and are so arranged that if the surface traversed by the finger is a true and perfect involute the stylus on the indicator will produce a vertical straight line. In FIGURE 4, when the cutter is properly modified the checks at the right hand side of the tooth 20 in FIGURE 3, when made in the planes A—A, B—B, and C—C, are as indicated in the figure. Thus, the check made in the plane A—A produces the solid line 40 which on the chart represents a low or minus involute. The involute check made at the center of the gear tooth in the plane B—B as indicated by the solid line 42, is without modification. Finally, the involute check made in the plane C—C along the line 36 adjacent the acute angle corners of the tooth is a high or plus involute as indicated by the solid line 44 which it will be noted is oppositely inclined from the line 40.

The cutter whose involutes are charted as indicated in FIGURE 4 will produce a gear the teeth of which when checked, which is in planes corresponding to the planes A—A, B—B and C—C, are all true involutes as indicated by the solid lines 46, 47 and 48.

It is to be understood that in these figures for simplicity, a condition has been illustrated in which it is assumed that the involutes desired on the teeth of the work gear are true unmodified involutes. It will be recalled however, that in many cases gear designers will call for a specific involute modification on the teeth of the gear which in turn will call for a corresponding modification of involute or profile on the teeth of the cutter so as to produce the desired or specified involute on the teeth of the gear.

For simplicity, reference is made herein to a particular modification of involute on the tooth surfaces of the gear shaving cutter or tool and it is to be understood that these modifications encompass not only a departure from a true involute conjugate to a true involute on the teeth of the gear, but also a like departure from involute profiles on the teeth of the cutter which are conjugate to modified profiles on the teeth of the gear.

As indicated above, the involute or profile errors which have been found to exist on the teeth of work gears shaved in accordance with prior known crossed axes gear shaving methods, were not large and in many cases were not considered significant. However, errors of a few ten thousandths of an inch are not acceptable in some utilization of high accuracy gearing. The amount of modification of cutters as suggested herein is in general dimensionally similar to the observed errors in profiles or involutes at the ends as compared to the centers of the gear teeth. Accordingly, experience has indicaeted that the modification of the profile or involute at opposite ends and at the same side of each tooth of a cutter will not differ from the profile or involute midway between the ends by an amount greater than .0010", and the difference in profile or involute between opposite end portions, which are oppositely modified, will not normally exceed .0015". From the foregoing it will be observed that in some cases the profile or involute modification adjacent one end of the tooth, although it will always be in the direction indicated above with respect to the profile or involute provided adjacent the mid-portion of the tooth, need not necessarily be equal in amount to the opposite modification provided adjacent the opposite end of the cutter tooth at the same side thereof. The exact amount of modification at each end can in general only be determined by trial. In this art it is usual to test a gear shaving cutter under service conditions and if in this test the modified cutter indicates that further modification is required, it may be provided by known methods.

While in the foregoing reference has been made particularly to profile modification, it is to be understood that other modifications may be present. For example, it has been customary in the past where gears are shaved by diagonal traverse or plunge shaving, to provide a "hollow lead" or longitudinal concavity in the cutter teeth which produces longitudinal convexity or crown on the gear teeth. Experience has shown that the profile errors of the type corrected by the cutter disclosed herein tend to be accentuated by this lead modification, so that in these cases the profile modification of the cutter is even more important.

In FIGURE 6 there is illustrated a tooth 50 in which the side surfaces 52 are provided with alternate rib and groove cutting elements and which are in addition longitudinally concave so as to produce predetermined longitudinal convexity or crown on the gear teeth.

The drawing and the foregoing specification constitute a description of the improved gear shaving cutter in such full, clear, concise and exact terms as to enable any person skilled in the art to practice the invention, the scope of which is indicated by the appended claims.

What we claim as our invention:

1. A gear shaving cutter for shaving the teeth of helical gears to have substantially identical profiles adjacent the ends of the teeth as well as midway between the ends of the teeth, said cutter being in the form of a cylindrical gear having helical teeth having cutting means on the side surfaces thereof, each tooth having two diagonally opposite obtuse and two diagonally opposite acute corners at the ends thereof defined by the intersection between the side and end surfaces thereof, said cutter teeth having tooth surfaces generally conjugate to the tooth surfaces desired on the gear teeth but modified from exactly conjugate profiles in that adjacent the obtuse corners of the cutter teeth the profile is low or minus and adjacent the acute angle corners of the cutter teeth the profile is high or plus as compared to the profile theoretically conjugate to the desired profile on the gear teeth.

2. A cutter as defined in claim 1 in which the teeth of the cutter, in addition to the profile modification, are longitudinally concave to provide a crown on the teeth of the work gears.

3. A cutter as defined in claim 1 in which the tooth surfaces of the gear tooth are essentially involute surfaces with predetermined involute modification, and in which the tooth surfaces of the cutter are conjugate thereto adjacent the portions of the cutter teeth generally midway between the ends thereof, and in which the generally involute profiles adjacent the obtuse corners thereof are low or minus profiles and the involute profiles adjacent the acute angle corners are high or plus involute with respect to the substantially involute profile generally midway between the ends of the cutter teeth.

4. A cutter as defined in claim 3 in which the amount of involute modification provided adjacent the ends of the cutter teeth with respect to the profile substantially midway between the ends thereof is not more than .0010".

5. A cutter as defined in claim 4 in which the amount of modification as defined therein is between .0002" and .0008".

6. A cutter as defined in claim 4 in which the involute modification provided at the same side of each cutter tooth adjacent opposite ends thereof are opposite in sign and the algebraic difference therebetween does not exceed .0015".

References Cited

UNITED STATES PATENTS

| 2,322,793 | 6/1943 | Drummond | 90—1.65 |
| 2,491,637 | 12/1949 | Austin | 29—103.3 |
| 2,859,508 | 11/1958 | Shannon | 29—103.2 |
| 3,006,060 | 10/1961 | Newman | 29—103.2 |

ANDREW R. JUHASZ, Primary Examiner

G. WEIDENFELD, Assistant Examiner

U.S. Cl. X.R.

90—1.6